(12) United States Patent
Karadag

(10) Patent No.: US 9,897,079 B2
(45) Date of Patent: Feb. 20, 2018

(54) EXTERNAL DISCHARGE HALL THRUSTER

(71) Applicant: Burak Karadag, Sagamihara (JP)

(72) Inventor: Burak Karadag, Sagamihara (JP)

(73) Assignee: Burak Karadag, Sagamihara (JP)

( * ) Notice: Subject to any disclaimer, the term of this patent is extended or adjusted under 35 U.S.C. 154(b) by 0 days.

(21) Appl. No.: 15/387,658

(22) Filed: Dec. 22, 2016

(65) Prior Publication Data

US 2017/0159648 A1  Jun. 8, 2017

Related U.S. Application Data

(60) Provisional application No. 62/277,992, filed on Jan. 13, 2016.

(51) Int. Cl.
*F03H 1/00* (2006.01)
*B64G 1/40* (2006.01)
*H01J 27/14* (2006.01)

(52) U.S. Cl.
CPC .......... *F03H 1/0075* (2013.01); *B64G 1/405* (2013.01); *F03H 1/0012* (2013.01); *F03H 1/0062* (2013.01); *F03H 1/0068* (2013.01); *H01J 27/143* (2013.01); *H01J 27/146* (2013.01)

(58) Field of Classification Search
CPC .... F03H 1/0062; F03H 1/0068; F03H 1/0075; H01J 27/143; H01J 27/146
See application file for complete search history.

(56) References Cited

U.S. PATENT DOCUMENTS 6,208,080 B1 * 3/2001 King .................. F03H 1/0075
                                                            313/362.1

OTHER PUBLICATIONS

Goebel "Fundamentals of Electric Propulsion: Ion and Hall Thrusters" 2008.*
Hopkins "Evaluation of magnesium as a Hall thruster propellant" 2015.*
Keidar "Analysis of Air Breathing Hall Effect Thruster" 2011.*
Ito "Ultra Low Power Stationary Plasma Thruster" 2014.*
Tsikata "Development and characterization of a wallless Hall thruster" 2014.*

* cited by examiner

*Primary Examiner* — Lorne Meade
*Assistant Examiner* — William Breazeal

(57) ABSTRACT

The invention is a Hall thruster that does not have any discharge channel, and magnetic pole piece. The Hall thruster utilizes permanent magnets to produce magnetic field with strong radial component in front of an annular anode, and expands propellant directly into vacuum through the anode acting also as a gas distributor. The invention reduces mass and complexity of conventional Hall thrusters, and offers a radical solution to discharge channel and magnetic pole piece erosion problem.

10 Claims, 4 Drawing Sheets

EXTERNAL DISCHARGE HALL THRUSTER

CROSS REFERENCE TO RELATED APPLICATIONS

This application claims priority from U.S. Provisional Application Ser. No. 62/277,992 filed Jan. 13, 2016, the disclosure of which is incorporated herein.

FIELD OF THE INVENTION

The present invention relates to space vehicle engines in general, and to Hall thrusters in particular.

BRIEF DESCRIPTION OF THE DRAWINGS

Features of the present invention can be better understood with reference to the drawings described below. The drawings are not necessarily to scale; emphasis instead generally being placed upon illustrating the principles of the invention.

BACKGROUND OF THE INVENTION

Figure 1:
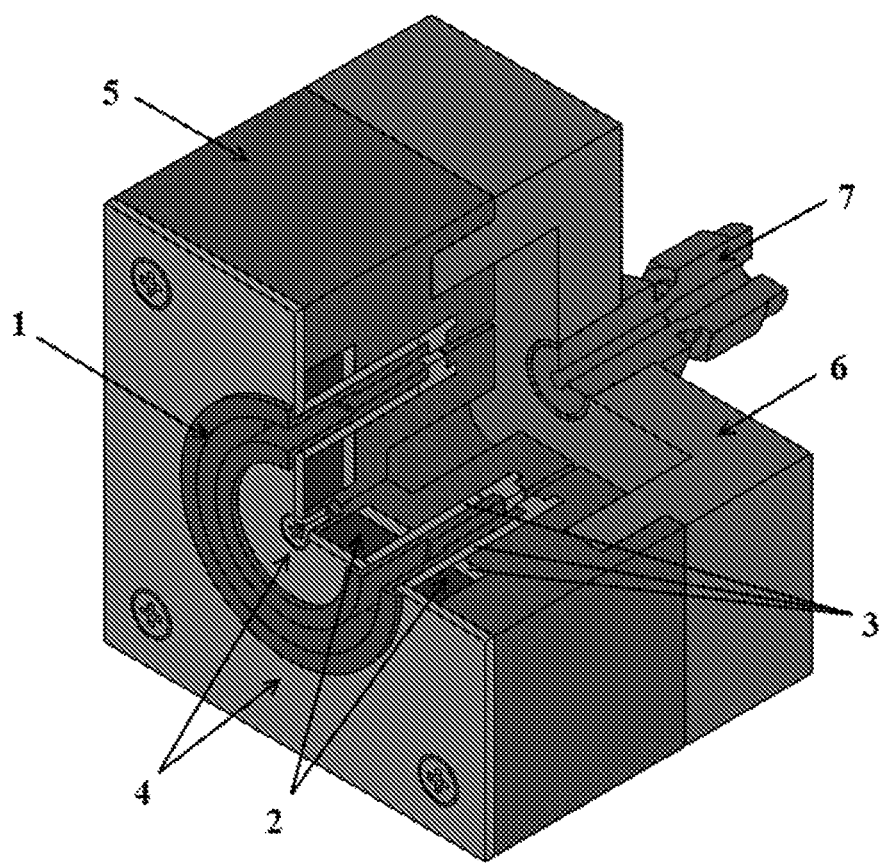
FIG. 1 illustrates a cutaway view of a preferred embodiment of the present invention.

Hall thruster is a type of electrostatic electric propulsion device, and it is used to carry out spacecraft attitude and orbit maneuvers.

Hall thrusters have high thrust density/efficiency, reliable/robust operation, simple design, and extensive space flight heritage. These main features make them attractive candidates for small/micro satellite applications. Scaling-down these devices to low power levels is quite a challenge because of the large surface area to volume, and the physical limits to the magnetic circuit miniaturization. Besides, scaling-down the thruster channel geometry results in short lifetime because of rapid erosion of thruster parts like discharge channel and magnetic pole piece, caused by increased plasma-wall interactions.

Plasma-wall interactions have substantial effects on discharge characteristics as well as on thruster performance. Power loss to the channel walls is the main power/efficiency loss source, and cause of erosion in conventional Hall thrusters. Therefore, development of low power Hall thrusters with longer lifetime remains an active area of research. My invention offers a radical solution to the scaling down and erosion problem of Hall thrusters by producing and sustaining plasma discharge completely outside a cavity.

SUMMARY OF THE INVENTION

The invention features a simple Hall thruster without discharge channel walls, magnetic core (i.e., ferromagnetic back plate), magnetic pole pieces, and electromagnetic coils.

The invention uses permanent magnets enabling power reduction relative to thrusters with electromagnets.

It is an object of the present invention to reduce overall propulsion system dry mass/volume, complexity, and cost to a great extent compared to conventional Hall thrusters. The invention can also reduce the need for very expensive and time-consuming lifetime tests rendering erosion research redundant. Besides, the invention can facilitate modeling of thruster plume and spacecraft interaction and can be beneficial for improving prediction accuracy of plasma simulation codes due to its simplified boundary conditions.

It is another object of the present invention to provide a Hall thruster capable of a very high lifetime with comparable thrust-to-power ratio, specific impulse, and anode efficiency.

Features and advantages of the invention will become more apparent from the following description and from the claims.

DETAILED DESCRIPTION OF THE INVENTION

In Hall thrusters, magnetic field generated by a set of coils and pole pieces traps and inserts electrons into spiral orbits. The entrapped electrons ionize the neutrals through collisions and gradually diffuse from the cathode to anode maintaining a strong axial electric field throughout the discharge channel. Axial electric field crossed with the radial magnetic field forces the electrons to drift azimuthally enabling quasi-neutral plasma acceleration and thrust generation. The problem in this process is that erosion of the channel walls and pole pieces that protect the magnetic circuit due to ion impingement leads to failure of the thruster. My invention describes a Hall thruster overcoming erosion problem by having both ionization and acceleration regions entirely in free space rather than a cavity. In addition to the channel walls, heavy magnetic core, pole pieces, electromagnetic coils and related power supplies are also eliminated through use of permanent magnets for a compact and lightweight thruster design minimizing failure modes of a thruster. The radial magnetic field is substantially higher compared to conventional Hall thrusters, which leads to a very strong confinement of electrons increasing electron neutral collision frequency to produce ion beam current.

In the present invention, an axial electric field is established between a positively biased anode, and a cathode. Working gas injected through the anode gets ionized due to collisions with energetic electrons. Strong radial magnetic field impedes plasma electrons from directly reaching the anode, and supply a potential drop in the axial direction. Ion acceleration due to the potential difference generates thrust.

The present invention describes a Hall thruster whose anode exit surface is located downstream of the magnetic field maximum extending outside the thruster exit plane in traditional sense.

Figure 3:
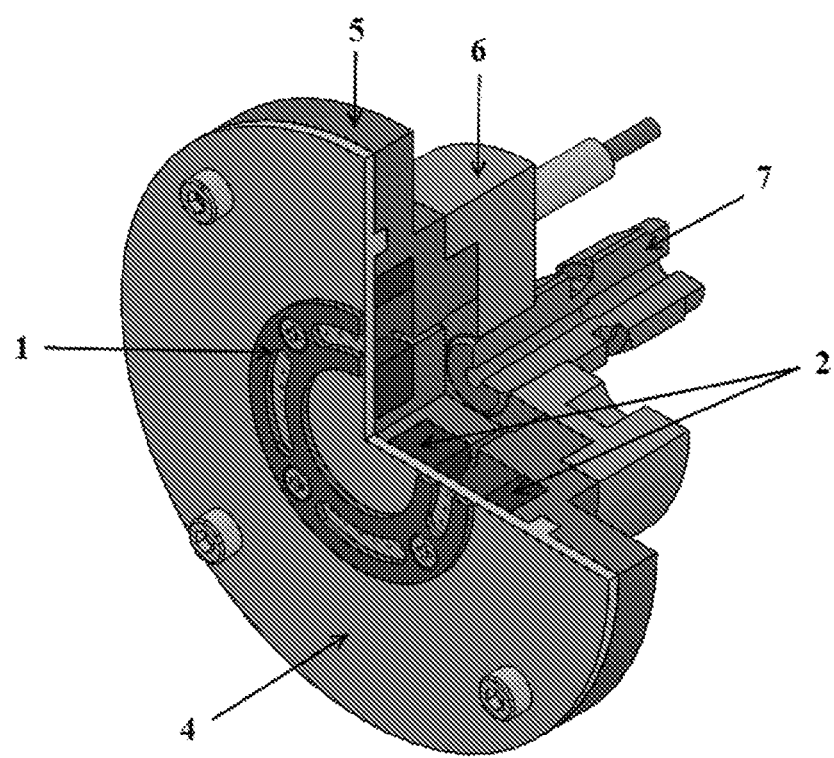
FIG. 3 illustrates a cutaway view of another preferred embodiment of the present invention.

Design of the invention may be understood with reference to FIG. 1 and FIG. 3. A preferred embodiment of the invention comprises a positively biased electrode anode 1 also serving as propellant distributor, permanent magnets 2, heat insulation walls 3, front walls 4, thruster body 5, gas distributor 6, tube fitting 7 and a cathode, which is not shown.

Figure 2:
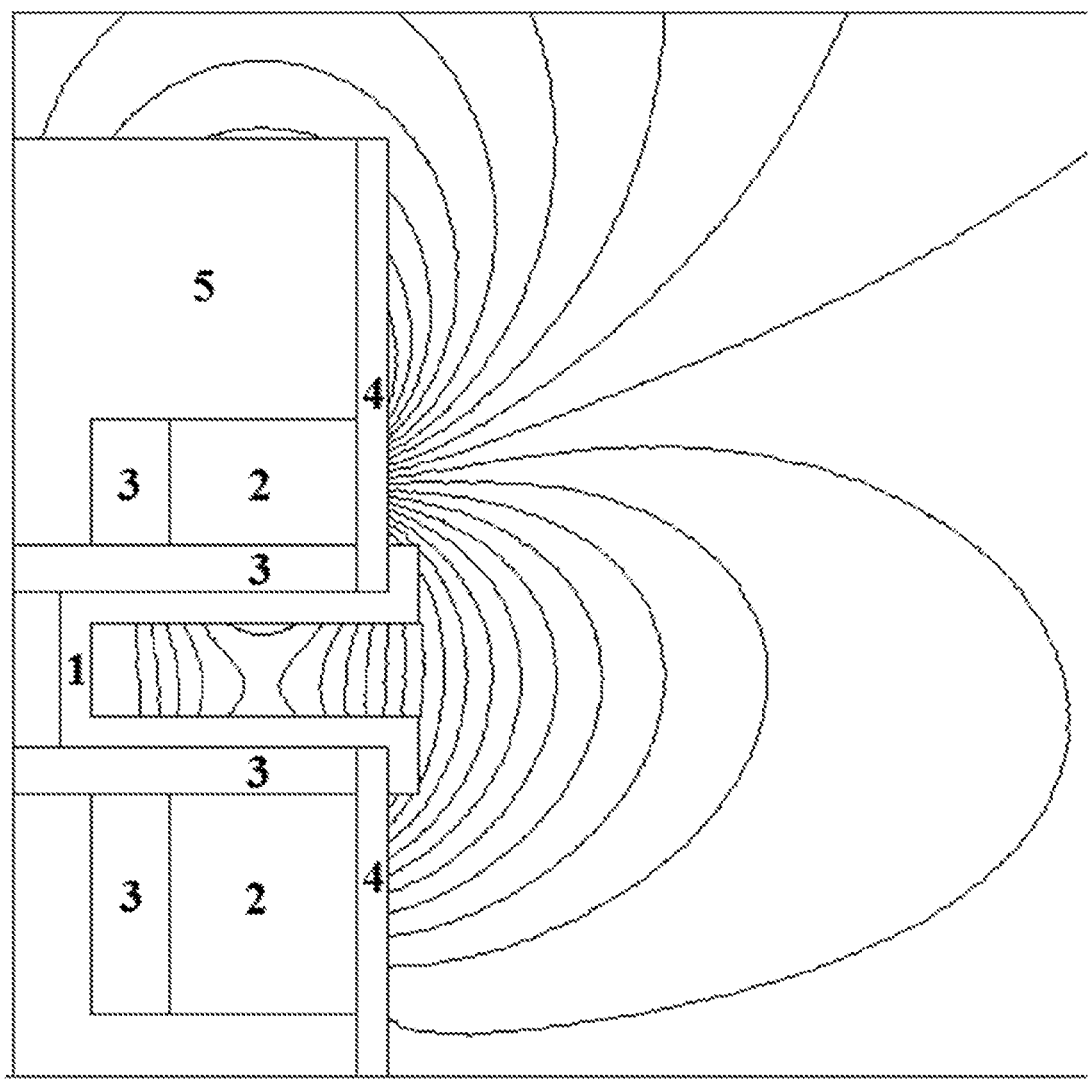
FIG. 2 schematically illustrates a magnetic field configuration calculated for a preferred embodiment of the invention.
Figure 4:
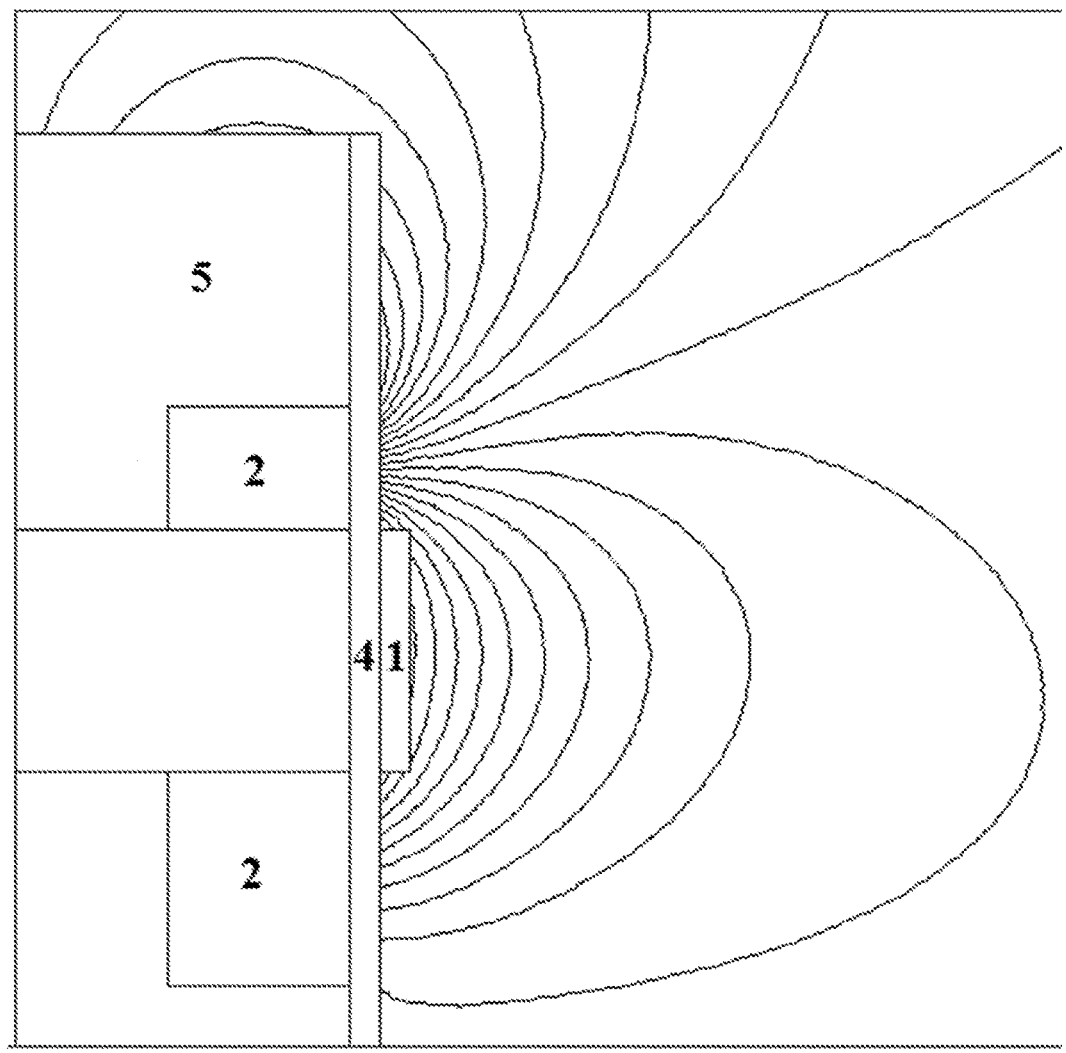
FIG. 4 schematically illustrates a magnetic field configuration calculated for another preferred embodiment of the invention.

Magnetic field profile of the invention may be understood with reference to FIG. 2 and FIG. 4

The invention is distinguished from other Hall thrusters in these aspects:
1) There is literally no discharge channel walls, so ionization of neutrals and acceleration of ions occur completely in open space outside the thruster structure.
2) Radial magnetic field strength is uncommonly high having negative-only gradient (dB/dz<0).

3) It does not have any magnetic pole piece, magnetic core, magnetic screen, or electromagnetic coil, which are the heaviest component of Hall thrusters.
4) It offers additional freedom of design optimization to make extremely non-uniform propellant feed or uniform easily by changing the anode 1 design.
5) An embodiment of the invention comprises a tube fitting 7, which is concentrically aligned with the anode delivers ionizable gas to the gas distributor 6 in order to improve azimuthal uniformity of the ionizable gas.

An embodiment of the invention has been tested experimentally, and results are given in reference: Karadag B., Cho S., Oshio Y., Funaki I., and Komurasaki K.: Preliminary Investigation of an External Discharge Plasma *Thruster*, 52nd AIAA/ASME/SAE/ASEE Joint Propulsion Conference & Exhibit, Jul. 25-27 2016, Salt Lake City, Utah.

As used in this specification and the appended claims, the singular forms "a", "an", and "the" include plural referents unless the content clearly dictates otherwise. The term "plurality" include two or more referents unless the content clearly dictates the otherwise. Unless defined otherwise, all technical and scientific terms used herein have the same meaning as commonly understood by one of ordinary skill in the art to which the invention pertains.

It should be noted that the description of the embodiments and attached figures presented in this specification does not limit the scope of the invention as covered by the appended claims, and serves only for a better understanding of the invention.

It is to be understood that a person of ordinary skilled in the art can make adjustments or amendments to the attached figures and above described embodiments that would still be covered by the following claims.

What I claim as my invention is:

1. A Hall thruster without discharge channel walls, magnetic core, magnetic pole pieces and electromagnetic coils, said Hall thruster comprising:
    an annular anode having a rear flat surface, a front surface, an inner annular surface and an outer annular surface, said annular anode comprising a plurality of holes to inject azimuthally and non-uniformly an ionizable gas, wherein, a degree of non-uniformity of the ionizable gas can be altered by modifying a number of holes comprising the plurality of holes or by modifying the dimensions of the holes comprising the plurality of holes:
    a magnetic circuit comprising:
    an inner permanent cylindrical hollow magnet adjacent to the inner annular surface and concentrically aligned with both the annular anode and a thruster longitudinal axis
    and an outer permanent cylindrical hollow magnet adjacent to the outer annular surface and concentrically aligned with the inner permanent cylindrical hollow magnet, wherein the inner permanent cylindrical hollow magnet and outer permanent cylindrical hollow magnet produce radially extending magnetic field lines;
    inner annular walls providing thermal insulation for the inner annular surface and outer annular walls providing thermal insulation for the outer annular surface;
    a gas distributor upstream of the anode;
    a cathode adjacent to the front surface of the annular anode,
    wherein the annular anode and the cathode are configured to generate an electric field, and
    wherein the Hall thruster is configured such that ionization of the ionizable gas to produce ions, and acceleration of the ions to produce thrust occurs entirely outside of any cavity of the Hall thruster.

2. A Hall thruster as recited in claim 1, wherein an annular tube fitting delivering the ionizable gas to the gas distributor is concentrically aligned with both the annular anode and the thruster longitudinal axis.

3. A Hall thruster as recited in claim 1, wherein peak radial magnetic field strength at a center of a hole among the plurality of holes or within the annular anode is larger than 600 Gauss and lower than 6000 Gauss.

4. The Hall thruster of claim 1, wherein the ionizable gas is a gas selected from the group of gases consisting of xenon, krypton, and argon.

5. The Hall thruster of claim 1, wherein the ionizable gas comprises a vapor produced from an element selected from the group of elements consisting of bismuth, iodine, magnesium, and zinc.

6. The Hall thruster of claim 1, wherein the ionizable gas comprises nitrogen and oxygen.

7. The Hall thruster of claim 1, wherein the ionizable gas comprises carbon dioxide.

8. The Hall thruster of claim 1, wherein the plurality of holes are a plurality of slots.

9. A Hall thruster without discharge channel walls, magnetic core, magnetic pole pieces and electromagnetic coils, said Hall thruster comprising:
    a thruster body;
    a planar annular anode, said planar annular anode comprising a plurality of holes configured to pass an ionizable gas therethrough;
    a planar wall having apertures arranged azimuthally therethrough, wherein a degree of non-uniformity of the ionizable gas can be altered by modifying a number of the apertures or by modifying a dimension of the apertures;
    an inner permanent cylindrical hollow magnet and an outer permanent cylindrical hollow magnet, wherein the inner permanent cylindrical hollow magnet and the outer permanent cylindrical hollow magnet produce radially extending magnetic field lines, and wherein the inner permanent cylindrical hollow magnet and the outer permanent cylindrical hollow magnet are concentrically aligned with both the planar annular anode and a thruster longitudinal axis;
    wherein a front surface of the planar wall is placed against the planar annular anode and wherein a rear surface of the planar wall is placed against the inner permanent cylindrical hollow magnet, the outer permanent cylindrical hollow magnet and the thruster body so that the planar annular anode is completely separated from the inner permanent cylindrical hollow magnet, the outer permanent cylindrical hollow magnet, and the thruster body;
    a gas distributor upstream of the anode;
    wherein the planar annular anode and a cathode are configured to generate an electric field, and
    wherein the Hall thruster is configured such that ionization of the ionizable gas to produce ions, and acceleration of the ions to produce thrust occurs entirely outside of any cavity of the Hall thruster.

10. The Hall thruster of claim 1, wherein a radial magnetic field strength throughout the annular anode has negative-only gradient (dB/dz<0).

* * * * *